United States Patent Office 3,574,082
Patented Apr. 6, 1971

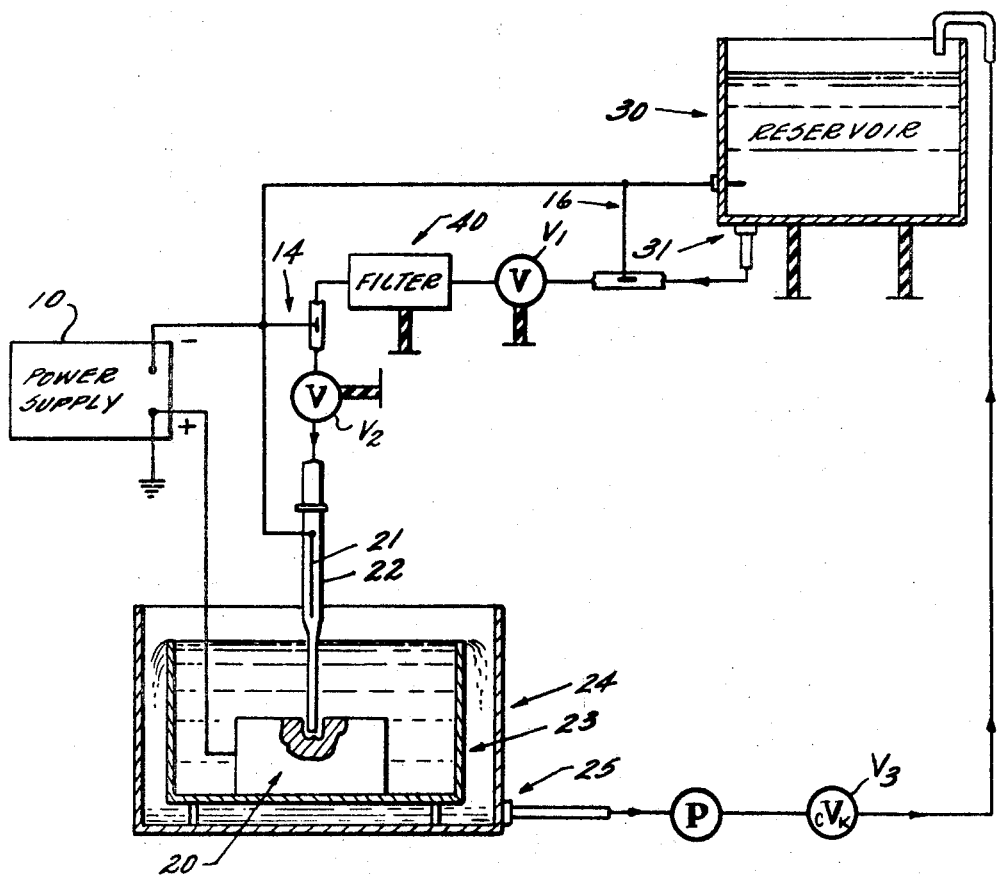

3,574,082
CURRENT LEAK PROTECTIVE CIRCUIT
James D. Andrews, Cincinnati, and John L. Bemesderfer, Hamilton, Ohio, assignors to General Electric Company
Filed May 29, 1968, Ser. No. 732,974
Int. Cl. B01k 3/00; B23p 1/04
U.S. Cl. 204—228                        5 Claims

ABSTRACT OF THE DISCLOSURE

An electrolytic apparatus for the removal of electrically conductive material from a workpiece utilizing a plurality of current bypass leak paths so placed as to cause short circuit current to bypass certain components of the electrolytic apparatus.

BACKGROUND OF THE INVENTION

Field of the invention

The invention relates to an apparatus for the selective electrolytic removal of material from a workpiece by the application of electric current through an electrolyte. At times, short circuits may occur between the apparatus and ground since the apparatus is at a substantial potential difference from ground. If such a short circuit should develop, a plurality of current bypass leak paths are provided in the apparatus to safeguard specific components within said apparatus and prevent excessive heating of the electrolyte, thereby maintaining full control over the electrolytic operation.

Description of prior art

In order to fully understand the electrolytic method and apparatus for the removal of electrically conductive material from a workpiece, your attention is directed to U.S. Patent application Ser. No. 474,833 filed on July 26, 1965 now U.S. 3,403,084. As noted therein, a potential difference of 300 to 1200 volts is impressed between the workpiece and the electrode in order to remove the metal from the workpiece.

Because of the large potential differences used in the process and apparatus, there is a possibility of a short circuit current leak being developed between the apparatus and ground. These current leaks have four effects. The first and most serious effect of a current leak is the possible damage resulting to check valves at various points within the apparatus which results in loss of electrolyte pressure control and consequent loss of dimensional control of the process. The second effect of a current leak is the resultant heating of the electrolyte utilized in the process, again resulting in a loss of dimensional control of the process. The third effect is a serious fire hazard and the fourth serious effect is the possibility of electrical shock to the operator of the apparatus.

Because of the effects associated with a possible short circuit current leak, the prior art tried repeatedly to obtain and design suitable protection for electrolytic apparatus. In trying to minimize the effects of a possible current leak, it has been customary to provide circuitry which would ascertain the existence of, and measure the amount of, such a current leak and upon discovery of such a leak would totally inactivate the electrolytic apparatus. Experience has shown that although this approach proved effective in minimizing some of the effects of a current leak, it did not eliminate the loss of control over the removal of the material from the workpiece.

SUMMARY OF THE INVENTION

As a result of the deficiencies noted above, prior art protection circuits have not been ideally suited for use with electrolytic drilling apparatus. The present invention obviates many of the prior art deficiencies and is capable of maintaining controlled drilling of the workpiece during the period of a current leak.

In the preferred embodiment disclosed herein, the invention relates to an electrolytic apparatus for removing, on a controlled basis, electrically conductive material from a workpiece even though a current leak has occurred. Briefly stated, in carrying out the invention in one form, a plurality of current bypass leak paths are strategically placed within the apparatus in order to protect certain components of the apparatus and also to control the drilling operation by preventing the excessive heating of the electrolyte. If a current leak does occur, the current will flow around certain components of the apparatus by means of the bypass leak paths, thereby eliminating extensive arcing which causes failure of the components and also heating of the electrolyte.

Accordingly, it is a primary object of this invention to provide an improved electrolytic apparatus utilizing current bypass leak paths to protect the apparatus and process from damage.

This, and other objects, advantages and features of the subject invention will hereinafter appear, and, for purposes of illustration, but not of limitation, an exemplary embodiment of the subject invention is shown in the appended drawings.

BRIEF DESCRIPTION OF THE DRAWINGS

FIG. 1 is a combined circuit diagram and flow chart of the apparatus showing the specific embodiment of the invention.

DESCRIPTION OF THE PREFERRED EMBODIMENT

Referring to FIG. 1, the circuit diagram and flow chart for the electrolytic apparatus is illustrated. The apparatus comprises a high voltage power supply 10 such as a 300–750 volt DC, 4 amp rectifier, the positive terminal or ground being connected to workpiece 20 and the negative terminal being connected to electrode 21. Electrode 21 is located within tool 22 to which an electrolyte can be fed from an electrolyte reservoir 30.

It should be understood that the voltage power supply 10 can also be an ordinary alternating high voltage supply wherein the results would show approximately the same depth of penetration rate but at about half the total volume of material removal as compared with the use of a direct current power source.

The workpiece 20, such as a tube or a plate in which holes are to be produced, is mounted on a holding fixture 23. In order to protect the operators of the apparatus from contact with the electrolyte, an enclosure 24 can be constructed around the apparatus and can include drain 25 to allow used electrolyte to flow from said enclosure.

As noted, the electrolyte is initially stored in reservoir 30, which can be a container of any shape and of sufficient size to hold a predetermined amount of liquid electrolyte. By means of gravity, the electrolyte is allowed to flow from the reservoir 30 through drain 31, into valve $V_1$, through a filter 40, into a valve $V_2$ and finally into the tool 22. The flow path of the electrolyte is as indicated in FIG. 1 by the small arrows. Upon discharge from the holding fixture 23, the used electrolyte flows out of drain 25 through pumping means designated as P and a check valve $V_3$, thereby being repumped into reservoir 30.

As mentioned above, electrode 21 placed within tool 22 is connected to the negative terminal of power supply 10. As the electrolyte passes around or through the electrode 21 the electrolyte obtains an electric charge. Since the electrolyte transfers this electric charge by means of the direct flow path through the components of the apparatus to the reservoir 30, it is necessary to maintain the reservoir 30 and other components of the apparatus insulated from ground. Specifically, you will note that reservoir 30, valve $V_1$, filter 40 and valve $V_2$ are all insulated from ground. In normal operation it is not uncommon for a current leak to develop between any of the components of the apparatus and ground, especially since the charged electrolyte passing through the components is fluidic in nature. If a current leak should occur, a current flow will be established between the negative terminal of the power supply 10 and the ground contact.

In order to minimize the flow of current through the electrolyte itself and the various components of the apparatus, a plurality of current bypass leak paths 14 and 16 are provided. These paths will work in the following manner. If a current leak occurred between valve $V_2$ and filter 40, the current flow from the negative terminal of power supply 10 to ground would pass directly through bypass path 14 rather than through electrode 21 and valve $V_2$. If, for example, the current leak to ground occurred somewhere between valve $V_1$ and drain 31 of the reservoir 30, the current flow from the negative terminal of power supply 10 to ground would pass directly through line 16 rather than through electrode 21, valve $V_2$ filter 40, and valve $V_1$. By elimination of the current path through the components of the apparatus, the problems of damaging certain components and of heating the electrolyte and thereby losing control over the electrolytic operation is eliminated. Although only two current leak bypass paths are illustrated in the particular embodiment, it should be recognized by a person skilled in the art that as many bypass paths may be placed as may be desired.

While preferred embodiments of the invention have been illustrated and described above, it will be understood that various changes and modifications may be made without departing from the spirit and scope of the invention, and it is intended to cover all such changes and modifications by the appended claims.

What is claimed as new and is desired to secure by Letters Patent of the United States is:

1. An electrolytic apparatus comprising:
   a power supply having a pair of terminals with an electric potential therebetween;
   means for electrically connecting a workpiece to one terminal of the said power supply;
   workpiece cutting means electrically connected to the other terminal of the said power supply;
   a container for holding an electrolytic fluid;
   fluid flowpath means connecting said container with said cutting means;
   a plurality of fluid control devices interposed in said fluid flowpath means; and
   means electrically connecting one of the terminals of said power supply to a plurality of points in the fluid flowpath means.

2. The apparatus recited in claim 1 wherein the terminal electrically connected with said fluid flowpath means is connected to points intermediate said fluid control devices.

3. The apparatus recited in claim 2 wherein the terminal connected to said cutting means is the terminal connected to said plurality of point.

4. The apparatus recited in claim 1 wherein said power supply has a direct current output.

5. In an electrolytic machining apparatus comprising means for containing an electrolyte, a cutting tool adapted for throughflow of said electrolyte, a fluid flowpath which includes fluid control means for controlling the flow of said electrolyte through said cutting tool, and power supply means for impressing a voltage potential between said cutting tool and a workpiece, the improvement which comprises:
   current leak prtoective means comprising an electrical connection between the said cutting tool and a plurality of points in said fluid flowpath.

References Cited
UNITED STATES PATENTS

| | | | |
|---|---|---|---|
| 2,432,013 | 12/1947 | Hanson | 204—228X |
| 3,406,103 | 10/1968 | Raetzsch | 204—231X |

TA-HSUNG TUNG, Primary Examiner

D. R. VALENTINE, Assistant Examiner

U.S. Cl. X.R.

204—224, 229